(12) United States Patent
Shonk

(10) Patent No.: US 10,443,548 B2
(45) Date of Patent: Oct. 15, 2019

(54) AIR INTAKE SYSTEM FOR A WORK VEHICLE

(71) Applicant: CNH Industrial America, LLC, New Holland, PA (US)

(72) Inventor: Jason L. Shonk, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/718,182

(22) Filed: Sep. 28, 2017

(65) Prior Publication Data

US 2019/0093608 A1  Mar. 28, 2019

(51) Int. Cl.
| | |
|---|---|
| *F02M 35/02* | (2006.01) |
| *F02M 35/08* | (2006.01) |
| *B01D 46/10* | (2006.01) |
| *F02M 35/024* | (2006.01) |
| *F02M 35/10* | (2006.01) |

(Continued)

(52) U.S. Cl.
CPC ... *F02M 35/02416* (2013.01); *B01D 46/0023* (2013.01); *B01D 46/0064* (2013.01); *B01D 46/10* (2013.01); *B60K 11/08* (2013.01); *B60K 13/02* (2013.01); *F02B 29/0475* (2013.01); *F02M 35/042* (2013.01); *F02M 35/086* (2013.01); *F02M 35/10229* (2013.01); *F02M 35/10268* (2013.01); *F02M 35/164* (2013.01);

(Continued)

(58) Field of Classification Search
CPC ....... F02M 35/02416; F02M 35/10229; F02M 35/10268; F02M 35/164; F02M 35/042; F02M 35/086; B01D 46/0023; B01D 46/0064; B01D 46/10; B60K 11/08; F02B 29/0475
See application file for complete search history.

(56) References Cited

U.S. PATENT DOCUMENTS

| | | |
|---|---|---|
| 3,630,003 A | 12/1971 | Ashton |
| 3,636,684 A | 1/1972 | Vogelaar et al. |

(Continued)

FOREIGN PATENT DOCUMENTS

| | | |
|---|---|---|
| EP | 0313763 | 5/1989 |
| EP | 1741894 A1 | 1/2007 |

(Continued)

OTHER PUBLICATIONS

European Search Report for EP Application No. 18194928.0 filed Dec. 7, 2018 (6 pages).

*Primary Examiner* — Jacob M Amick
(74) *Attorney, Agent, or Firm* — Peter K. Zacharias; Patrick M. Sheldrake

(57) ABSTRACT

In one aspect, an air intake system for supplying air to an engine of a work vehicle may include a cooler box having a first wall and a second wall, with the first and second walls at least partially defining a chamber within the cooler box. The air intake system may also include a screen defining at least a portion of the first wall of the cooler box. Furthermore, the air intake system may include an air filter assembly defining at least a portion of the second wall of the cooler box. The air filter assembly may be configured to remove particles present in the air exiting the chamber of the cooler box through the air filter assembly. The air exiting the cooler box through the air filter assembly may be supplied to the engine for combustion.

18 Claims, 7 Drawing Sheets

(51) Int. Cl.
*B01D 46/00* (2006.01)
*B60K 11/08* (2006.01)
*F02M 35/16* (2006.01)
*F02B 29/04* (2006.01)
*F02M 35/04* (2006.01)
*B60K 13/02* (2006.01)

(52) U.S. Cl.
CPC ..... *B01D 2279/60* (2013.01); *B60Y 2200/222* (2013.01)

(56) References Cited

U.S. PATENT DOCUMENTS

| | | |
|---|---|---|
| 7,878,171 B2 | 1/2011 | Vandike et al. |
| 7,946,368 B2 | 5/2011 | Vandike et al. |
| 7,997,238 B2 | 8/2011 | D'Hondt et al. |
| 8,596,396 B1 * | 12/2013 | Ricketts ............ A01D 41/1252 123/41.11 |
| 9,222,448 B2 | 12/2015 | Ghorpade et al. |
| 2007/0012000 A1 | 1/2007 | Maas et al. |
| 2008/0257531 A1 * | 10/2008 | D'hondt ............ A01D 41/1252 165/104.34 |
| 2009/0308346 A1 | 12/2009 | Vandike et al. |

FOREIGN PATENT DOCUMENTS

| | | | |
|---|---|---|---|
| FR | 2925351 | A1 | 6/2009 |
| WO | 2014187735 | A1 | 11/2014 |

* cited by examiner

AIR INTAKE SYSTEM FOR A WORK VEHICLE

FIELD

The present disclosure generally relates to work vehicles and, more particularly, to air intake systems for supplying air to an engine of a work vehicle.

BACKGROUND

Work vehicles typically include internal combustion engines that require clean air for use within the combustion process. Since many work vehicles, such as harvesters and other agricultural work vehicles, operate in fields and other harvesting environments in which the ambient air contains large amounts of dust, plant matter, debris, particulates, and other particles, an air intake system providing effective air filtration is required. As such, conventional air intake systems include a primary air filter and a secondary air filter positioned downstream from primary air filter. In general, the primary air filter is configured to remove larger particles from the air, while the secondary air filter is configured to remove smaller particles that pass through the primary air filter. In certain configurations, the primary and secondary air filters are spaced apart from a cooler box from which the air filters receive air. For example, the secondary air filter may be nested or otherwise positioned within the primary air filter at a location separate from the cooler box. Unfortunately, such an air filter configuration occupies a large amount of space within the engine compartment of the work vehicle.

Accordingly, an improved air intake system for a work vehicle that occupies less space within the vehicle's engine compartment would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to an air intake system for supplying air to an engine of a work vehicle. The air intake system may include a cooler box having a first wall and a second wall, with the first and second walls at least partially defining a chamber within the cooler box. The air intake system may also include a screen defining at least a portion of the first wall of the cooler box. The screen may be configured to remove particles present in air entering the chamber of the cooler box. Furthermore, the air intake system may include an air filter assembly defining at least a portion of the second wall of the cooler box. The air filter assembly may include an air filter element configured to remove particles present in the air exiting the chamber of the cooler box through the air filter assembly. The air exiting the cooler box through the air filter assembly may be supplied to the engine for combustion.

In another aspect, the present subject matter is directed to a work vehicle. The work vehicle may include an engine and a cooler box having a first wall and a second wall, with the first and second walls defining a chamber of the cooler box. The work vehicle may also include a screen defining at least a portion of the first wall of the cooler box. The screen may be configured to remove particles present in air entering the chamber of the cooler box. The work vehicle may further include an air filter assembly defining at least a portion of the second wall of the cooler box. The air filter assembly may include an air filter element configured to remove particles present in the air exiting the chamber of the cooler box through the air filter assembly. Additionally, the work vehicle may include air conduit extending between the air filter and the engine, with the air conduit being configured to supply air from the air filter to the engine for combustion.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
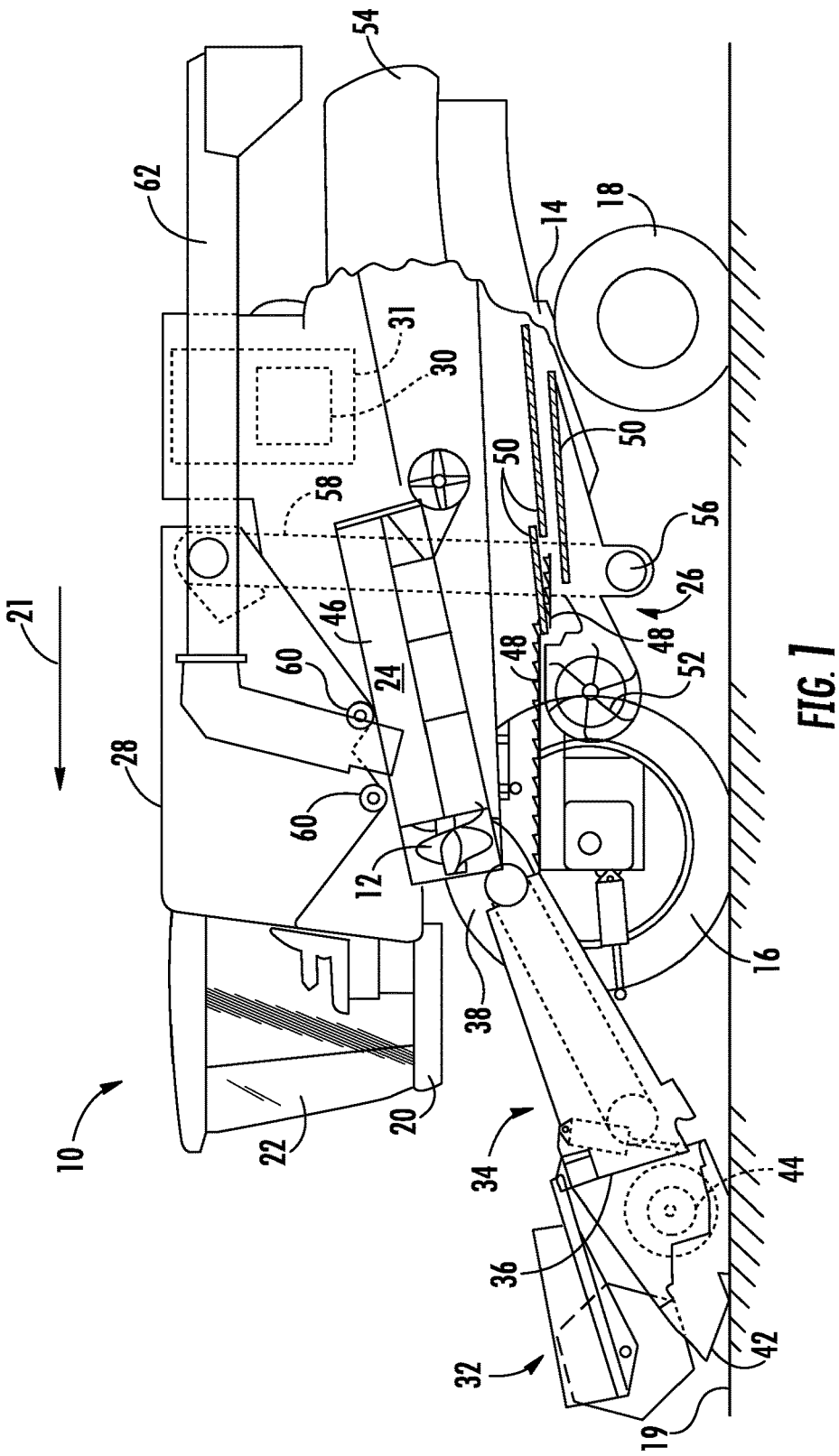
FIG. 1 illustrates a side view of one embodiment of work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an air intake system for supplying air to an engine of a work vehicle. Specifically, in several embodiments, the air intake system includes a cooler box having various walls, such as a first wall and a second wall, which at least partially define a chamber of the cooler box. In one embodiment, one or more heat exchangers may be positioned within the chamber of the cooler box. The air intake system may also include a screen defining at least a portion of the first wall of the cooler box such that the screen may be configured to remove particles present in air entering the chamber of the cooler box. Furthermore, the air intake system may include a primary air filter assembly defining at least a portion of the second wall of the cooler box. Since the primary air filter assembly defines a portion of the cooler box, the assembly occupies less space within the engine compartment of the work vehicle than conventional primary air filters.

Referring now to the drawings, FIG. 1 illustrates a simplified, partial sectional side view of one embodiment of a work vehicle 10. As shown, the work vehicle 10 may be configured as an axial-flow type combine in which crop material is threshed and separated while it is advanced by and along a longitudinally arranged rotor 12. The work vehicle 10 may include a chassis or main frame 14 having a pair of driven, ground-engaging front wheels 16 and a pair of steerable rear wheels 18. The wheels 16, 18 may be configured to support the work vehicle 10 relative to a ground surface 19 and move the work vehicle 10 in a forward direction of travel 21 relative to the ground surface 19. Additionally, an operator's platform 20 with an operator's cab 22, a threshing and separating assembly 24, a grain cleaning assembly 26, and a crop tank 28 may be supported by the frame 14. Furthermore, as is generally understood, the work vehicle 10 may include an engine 30 mounted on the frame 14 and positioned within an engine compartment 31. A transmission (not shown) may be operably coupled to the engine 30 and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the work vehicle 10 to allow the front end 36 of the feeder 34 and, thus, the header 32 to be moved upwardly and downwardly relative to the ground 19 to set the desired harvesting or cutting height for the header 32.

As the work vehicle 10 is propelled forwardly over a field with standing crop, the crop material is severed from the stubble by a sickle bar 42 at the front of the header 32 and delivered by a header auger 44 to the front end 36 of the feeder 34, which supplies the harvested crop to the threshing and separating assembly 24. As is generally understood, the threshing and separating assembly 24 may include a cylindrical chamber 46 in which the rotor 12 is rotated to thresh and separate the harvested crop received therein. That is, the harvested crop is rubbed and beaten between the rotor 12 and the inner surfaces of the chamber 46, whereby the grain, seed, or the like, is loosened and separated from the straw.

The harvested crop which has been separated by the threshing and separating assembly 24 falls onto a series of pans 48 and associated sieves 50, with the separated harvested crop being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that remove chaff and other impurities from the harvested crop. For instance, the fan 52 may blow the impurities off of the harvested crop for discharge from the work vehicle 10 through the outlet of a straw hood 54 positioned at the back end of the work vehicle 10.

The cleaned harvested crop passing through the sieves 50 may then fall into a trough of an auger 56, which may be configured to transfer the harvested crop to an elevator 58 for delivery to the associated crop tank 28. Additionally, in one embodiment, a pair of tank augers 60 at the bottom of the crop tank 28 may be used to urge the cleaned harvested crop sideways to an unloading tube 62 for discharge from the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration.

Figure 2:
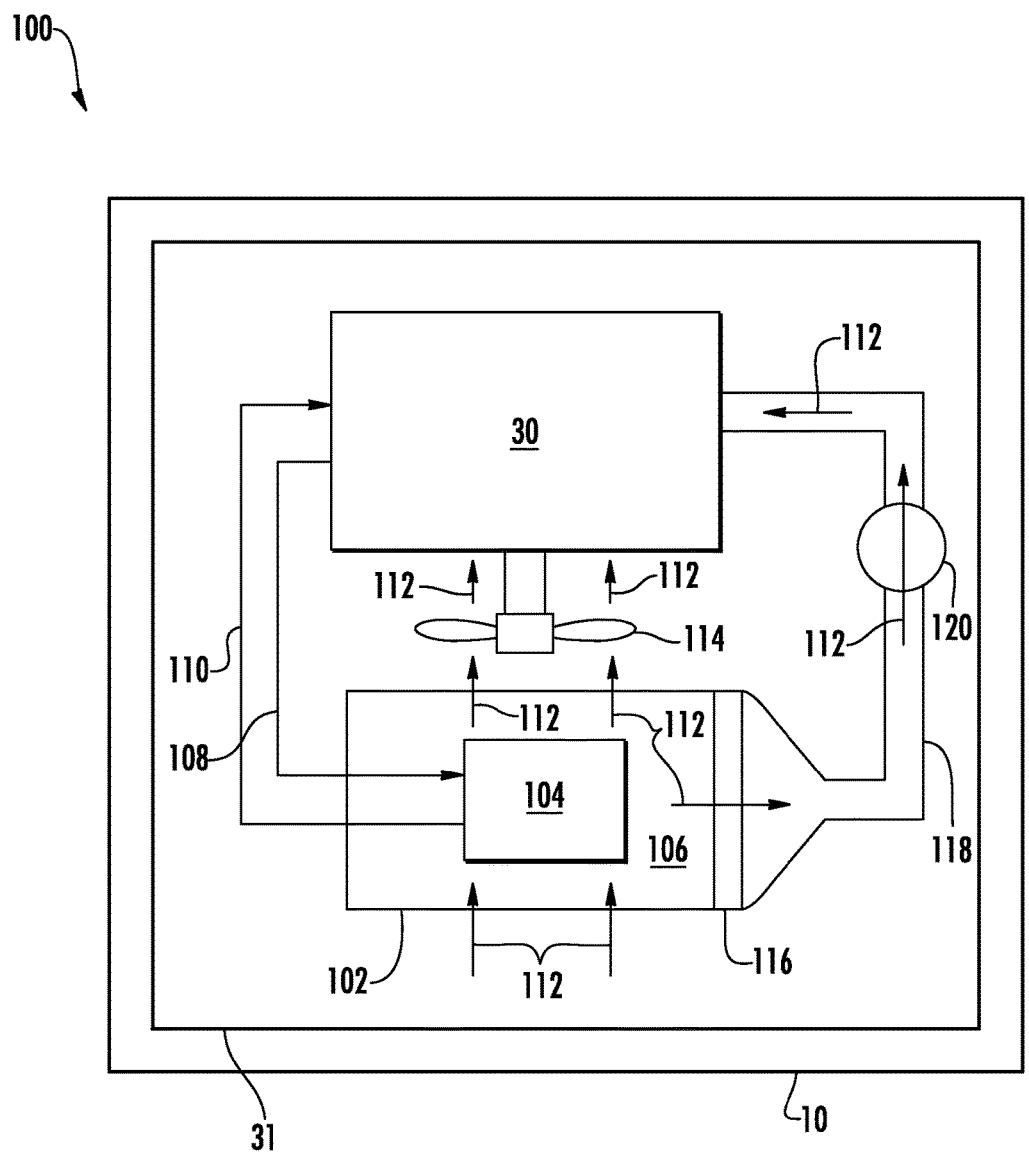
FIG. 2 illustrates a top schematic view of one embodiment of an air intake system in accordance with aspects of the present subject matter.

Referring now to FIG. 2, a schematic, side view of one embodiment of an air intake system 100 for supplying air to an engine of a work vehicle is illustrated in accordance with aspects of the present subject matter. In general, the air intake system 100 will be described herein with reference to the work vehicle 10 described above with reference to FIG. 1. However, it should be appreciated by those of ordinary skill in the art that the disclosed system 100 may generally be utilized with work vehicles having any other suitable work vehicle configuration.

As shown in FIG. 2, the air intake system 100 may include a cooler box 102 that is at least partially positioned within the engine compartment 31 of the work vehicle 10. In several embodiments, the cooler box 102 may define a chamber 106 configured to house one or more heat exchangers 104 associated with the engine 30. In general, the heat exchanger(s) 104 may be configured to cool or otherwise reduce the temperature of one or more fluids (e.g., coolant, oil, transmission fluid, air, etc.) that support the operation of the engine 30. For example, in one embodiment, a supply line (e.g., as indicated by arrow 108) may provide fluid from the engine 30 to the heat exchanger(s) 104 for cooling thereof. Similarly, a return line (e.g., as indicated by arrow 110) may convey the fluid from the heat exchanger(s) 104 back to the engine 30. It should be appreciated that the heat exchanger(s) 104 may, for example, correspond to one or more radiators, oil coolers, transmission coolers, intercoolers, and/or the like.

In general, air (e.g., as indicated by arrows 112) may flow through the cooler box 102 to cool the fluids circulating through the heat exchanger(s) 104. More specifically, a fan 114 (e.g., an engine-driven fan) may draw the air 112 into the cooler box 102. As the air 112 flows over the heat exchanger(s) 104, the air 112 may absorb heat from the fluids therein. A portion of the air 112 may then exit the cooler box 102 and flow over the engine 30, thereby cooling the engine 30. As will be described below, another portion of the air 112 may exit the cooler box 102 through a primary air filter assembly 116. The air 112 directed through the primary air filter assembly 116 may then flow through both an air conduit 118 and a second air filter 120 before being supplied to the engine 30 for combustion.

Figure 3:
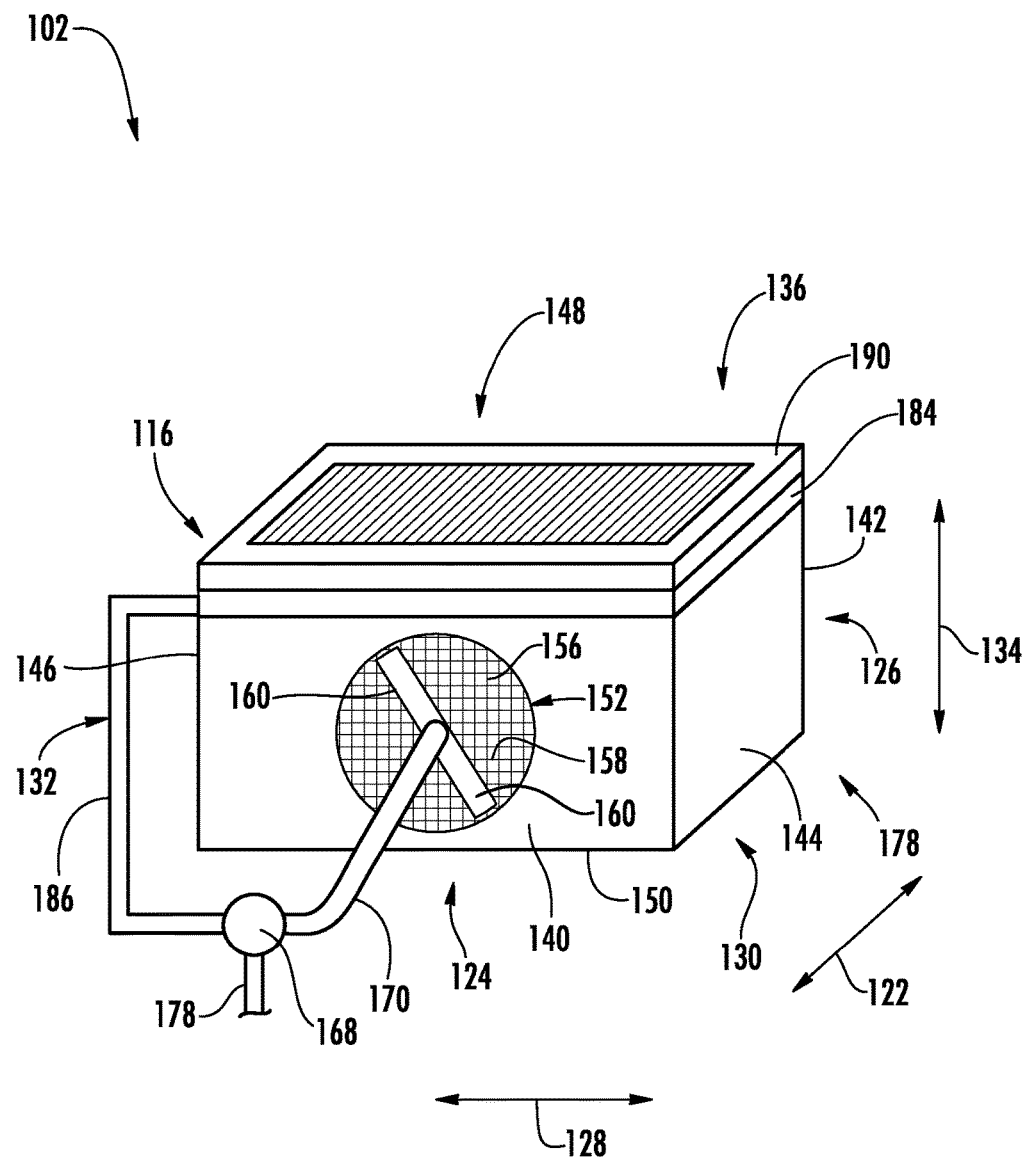
FIG. 3 illustrates a perspective view of one embodiment of a cooler box suitable for use within the disclosed air intake system in accordance with aspects of the present subject matter, particularly illustrating a primary air filter assembly of the air intake system at least partially defining a top wall of the cooler box.
Figure 4:
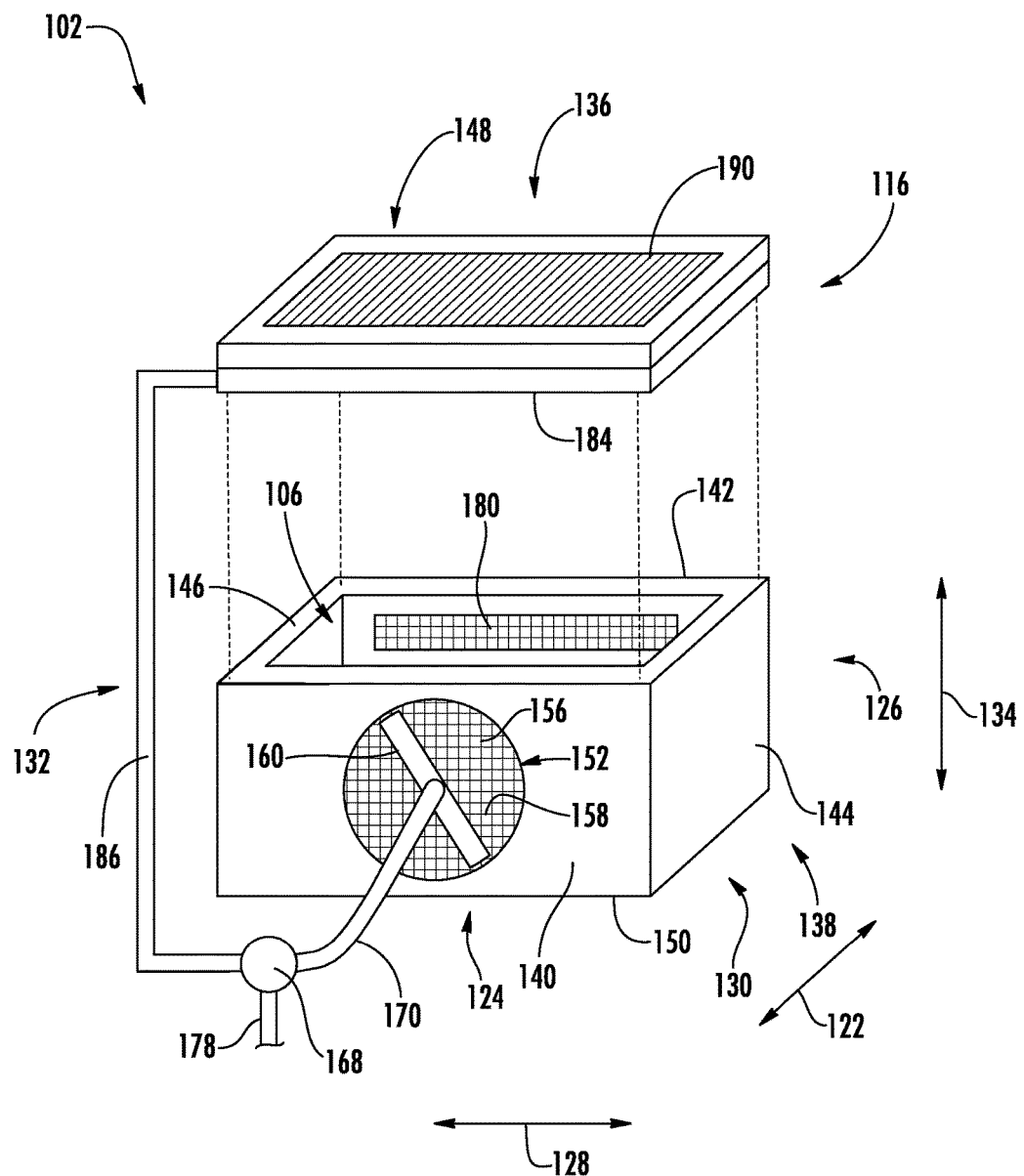
FIG. 4 illustrates an exploded, perspective view of the embodiment of the cooler box shown in FIG. 3 in accordance with aspects of the present subject matter, particularly illustrating the cooler box defining a chamber therein.

Referring now to FIGS. 3 and 4, one embodiment of the cooler box 102 described above is illustrated in accordance with aspects of the present disclosure. More specifically, FIG. 3 illustrates an assembled, perspective view of the cooler box 102. Additionally, FIG. 4 illustrates a partially exploded, perspective view of the cooler box 102, with the primary air filter assembly 116 being exploded away from the cooler box 102.

As shown in FIGS. 3 and 4, the cooler box 102 may extend in a longitudinal direction (e.g., as indicated by arrows 122 in FIGS. 3 and 4) between a forward end 124 and an aft end 126. The cooler box 102 may also extend in a lateral direction (e.g., as indicated by arrows 128 in FIGS. 3 and 4) between a first side 130 and a second side 132. Furthermore, the cooler box 102 may extend in a vertical direction (e.g., as indicated by arrows 134 in FIGS. 3 and 4) between a top end 136 and a bottom end 138. In addition, the cooler box 102 may include various walls, such as a forward wall 140 positioned at the forward end 124 of the cooler box 102, a rear wall 142 positioned at the rear end 126 of the cooler box 102, a first side wall 144 positioned on the first side 130 of the cooler box 102, a second side wall 146 positioned on the second side 132 of the cooler box 102, a top wall 148 positioned at the top end 136 of the cooler box 102, and a bottom wall 150 positioned at the bottom end 138 of the cooler box 102. In general, the walls 140, 142, 144, 146, 148, 150 may collectively define the chamber 106 within the cooler box 102 in which the heat exchanger(s) 104 is positioned. However, it should be appreciated that, in alternative embodiments, the cooler box 102 may have any other suitable configuration.

In several embodiments, the cooler box 102 may include an inlet screen 152 that defines at least a portion of one of the walls 140, 142, 144, 146, 148, 150. In general, the inlet screen 152 may be configured to remove particles 154 (FIG. 5) present in the air 112 entering the chamber 106 of the cooler box 102. As used herein, the term "particle" may generally refer to plant material (e.g., leaves), dust, debris, particulates, and/or any other object present in the air 112 entering the cooler box 102. In this respect, the term "particle" may generally refer to objects having any size. In one embodiment, the screen 152 may include a plurality of interconnected bars or other structural members, such as vertical bars 156 and horizontal bars 158, which are arranged in a lattice-like structure to allow the air 112 to pass through the screen 152, while preventing any particles 154 contained within the air 112 from passing therethrough. In the embodiment illustrated in FIGS. 3 and 4, the inlet screen 152 generally defines all or a portion of the forward wall 140 of the cooler box 102. However, it should be appreciated that, in alternative embodiments, the inlet screen 152 may define all or a portion of any other wall 142, 144, 146, 148, 150 of the cooler box 102 that is configured to serve as an intake or inlet for receiving air within the chamber 106 of the cooler box 102.

Figure 5:
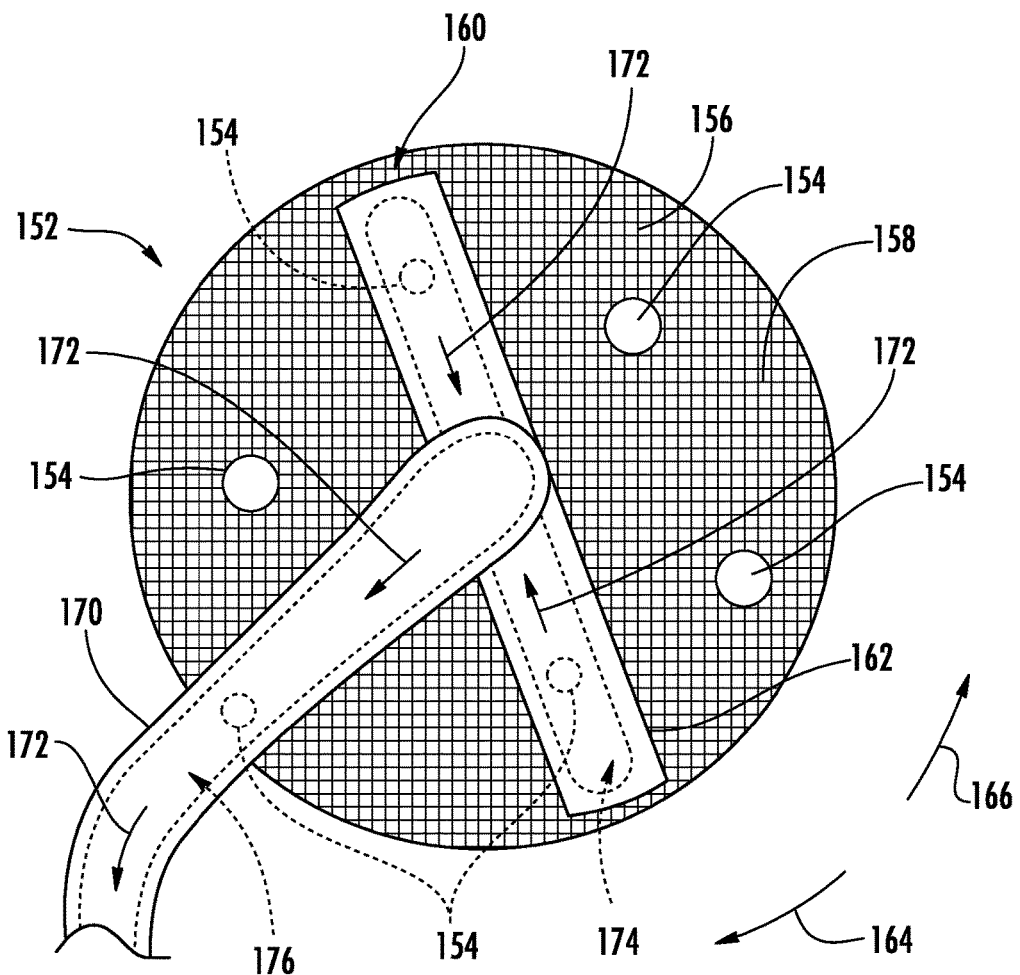
FIG. 5 illustrates a front view of one embodiment of an inlet screen and an inlet screen pre-cleaner suitable for use within the disclosed air intake system in accordance with aspects of the present subject matter.

Referring now to FIGS. 3-5, the air intake system 100 may also include an inlet screen pre-cleaner 160 configured to remove any particles 154 that has accumulated on the inlet screen 152. Specifically, in several embodiments, the pre-cleaner 160 may include a wand 162 configured to be rotated relative to the inlet screen 152, such as in a first direction (e.g., as indicated by arrow 164 in FIG. 5) and/or a second direction (e.g., as indicated by arrow 166 in FIG. 5). The air intake system 100 may also a vacuum source, such as a vacuum pump 168 or an exhaust system (not shown) of the engine 30, and a particles conduit 170 that fluidly couples the vacuum source and the wand 162. As such, the vacuum source (e.g., pump 168) may be configured to generate a vacuum (e.g., as indicated by arrows 172 in FIG. 5) within the wand 162 and the particles conduit 170. In this regard, as shown in FIG. 5, as the wand 162 rotates relative to the inlet screen 152 and passes over the particles 154, the vacuum 172 generated by the vacuum pump 168 pulls the particles 154 into a passage 174 defined by the wand 162. The particles 154 then flows through the passage 174 in the wand 162 and a corresponding passage 176 defined by the particles conduit 170 before being expelled by a discharge pipe 178 coupled to the vacuum pump 168. However, it should be appreciated that, in alternative embodiments, the inlet screen pre-cleaner 160 may have any suitable pre-cleaner configuration. Furthermore, in some embodiments, the air intake system 100 may not include the pre-cleaner 160.

Referring now to FIG. 4, the cooler box 102 may also include an outlet screen 180 that defines at least a portion of one of its walls 140, 142, 144, 146, 148, 150. In general, the outlet screen 180 may be configured to permit a portion of the air 112 within the chamber 106 of the cooler box 102 to exit therefrom. For example, in one embodiment, the portion of the air exiting the chamber 106 through the outlet screen 152 may flow over the engine 30 to provide cooling to the engine 30 as described above with reference to FIG. 2. In the embodiment illustrated in FIG. 4, the outlet screen 180 defines all or a portion of the rear wall 142. However, it should be appreciated that, in alternative embodiments, the outlet screen 180 may define all or a portion of any other wall 140, 144, 146, 148, 150 of the cooler box 102 that is configured to serve as an exhaust or outlet for expelling at least a portion of the air contained within the chamber 106 of the cooler box 102.

As indicated above, the air intake system 100 may include a primary air filter assembly 116 provided in operative association with the cooler box 106. In general, the primary air filter assembly 116 may be configured to remove particles 182 (FIG. 7) present in the air 112 exiting the chamber 106 of the cooler box 102 through the primary air filter assembly 116. For example, as indicated above, in one embodiment, the portion of the air 112 exiting the chamber 106 through the primary air filter assembly 116 may be supplied to the engine 30 for combustion.

Figure 6:
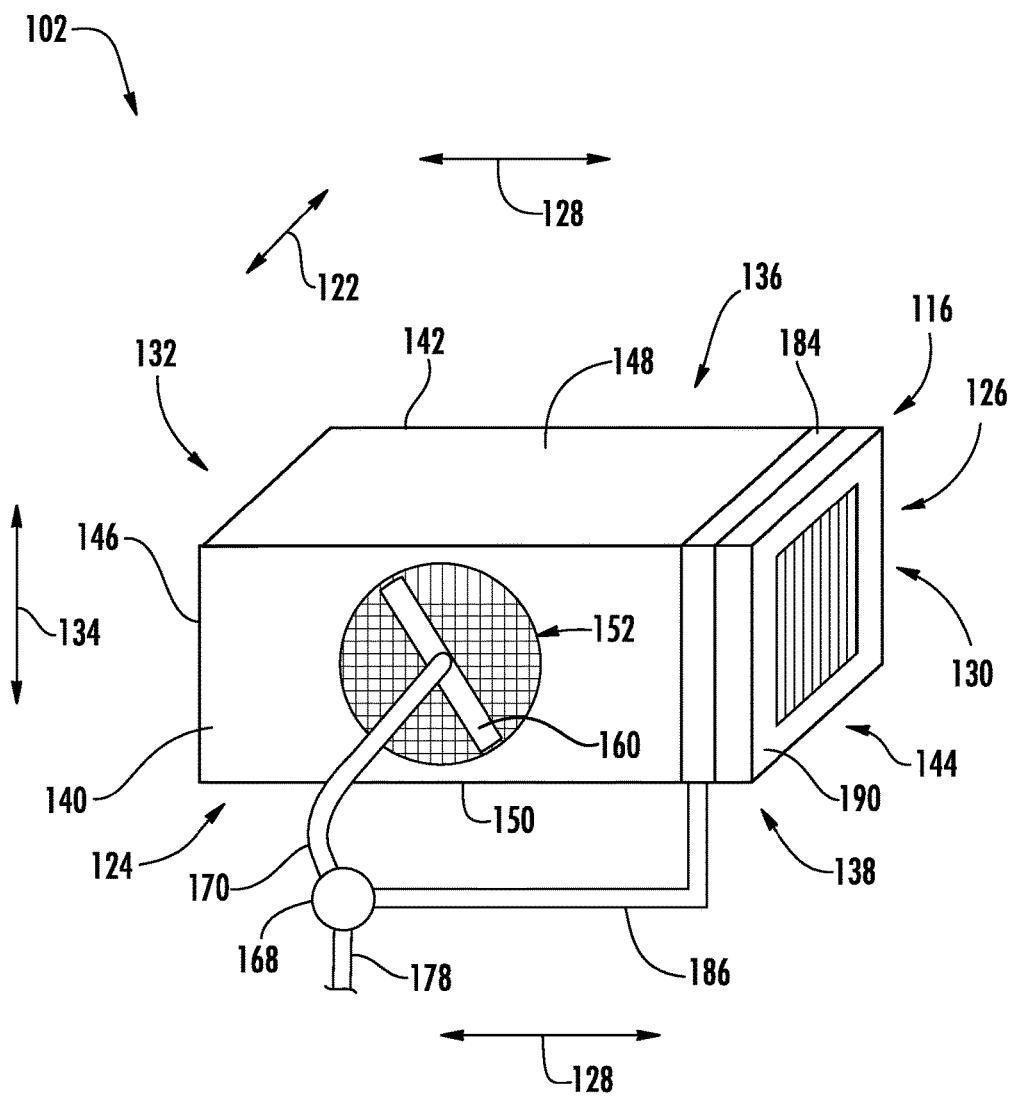
FIG. 6 illustrates a perspective view of another embodiment of a cooler box suitable for use within the disclosed air intake system in accordance with aspects of the present subject matter, particularly illustrating a primary air filter assembly of the air intake system at least partially defining a first side wall of the cooler box.

As illustrated in FIGS. 3, 4, and 6, the primary air filter assembly 116 may be configured to define all or a portion of one of the walls 140, 142, 144, 146, 148, 150 of the cooler box 102. For example, in the embodiment illustrated in FIGS. 3 and 4, the primary air filter assembly 116 defines all or a portion of the top wall 148 of the cooler box 102. Conversely, in the embodiment illustrated in FIG. 6, the primary air filter assembly 116 defines all or a portion of the first side wall 144 of the cooler box 102. In such embodiments, the wall of the cooler box 102 associated with the primary air filter assembly 116 may generally be oriented perpendicular relative to the wall associated with the inlet screen 152 (e.g., the forward wall 140 of the cooler box 102). However, it should be appreciated that, in alternative embodiments, the primary air filter assembly 116 may define all or a portion of any other wall 140, 142, 146, 150 of the cooler box 102. Furthermore, although the primary air filter assembly 116 is illustrated as having a rectangular cross-section, the primary air filter assembly 116 may have any suitable cross-section.

Figure 7:
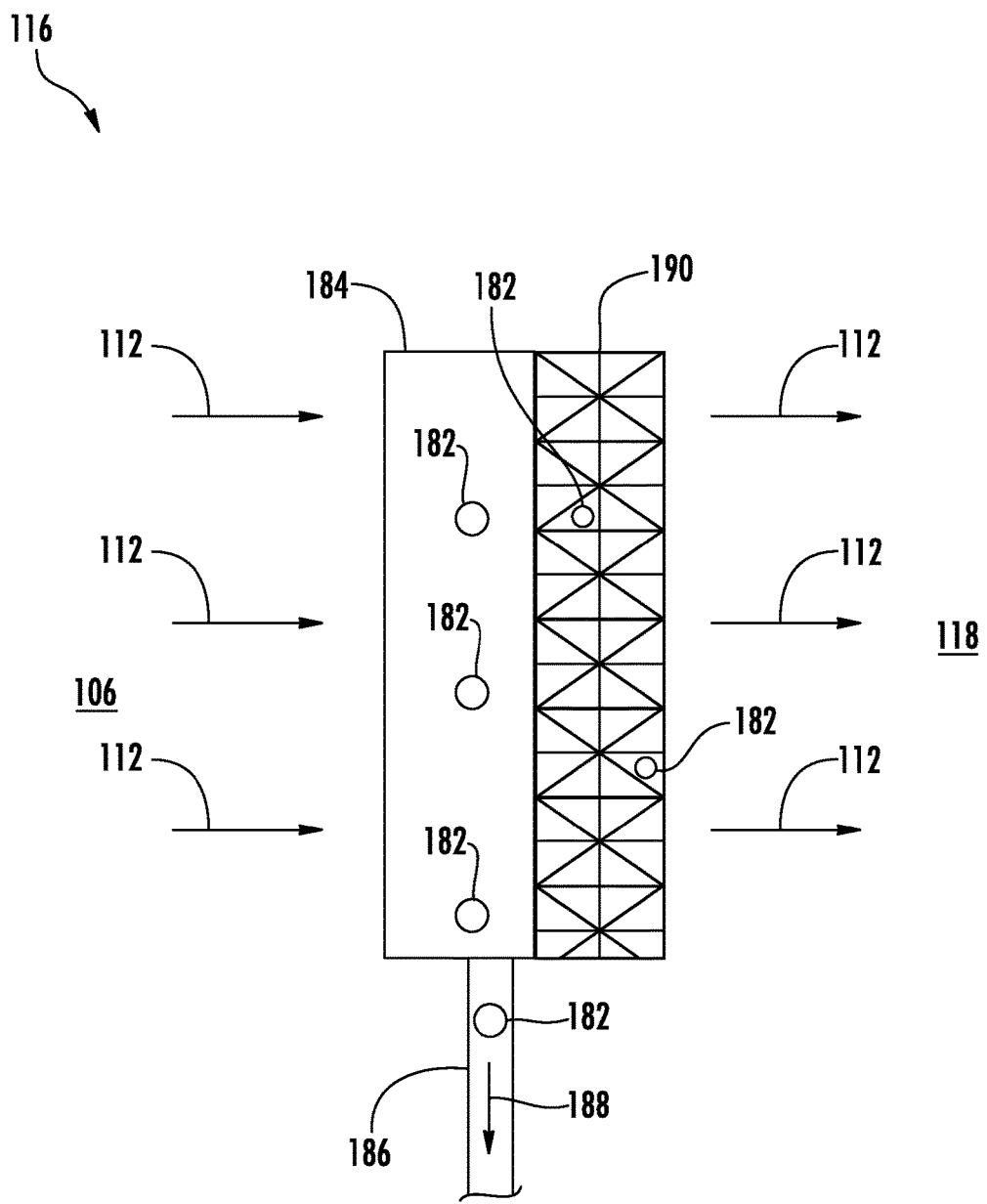
FIG. 7 illustrates a cross-sectional side view of one embodiment of a primary air filter assembly suitable for use within the disclosed air intake system in accordance with aspects of the present subject matter, particularly illustrating air flowing through a primary air filter pre-cleaner and a primary air filter element of the primary air filter assembly.

As shown in FIGS. 3, 4, and 7, the primary air filter assembly 116 of the air intake system 100 may include a primary air filter pre-cleaner 184. In general, the pre-cleaner 184 may be configured to remove the particles 182 in the air 112 flowing through the pre-cleaner 184. Specifically, in several embodiments, the pre-cleaner 184 may be fluidly coupled to a vacuum source (e.g., vacuum pump 168) via a particulate conduit 186. As such, the vacuum pump 168 may be configured to generate a vacuum (e.g., as indicated by arrows 188 in FIG. 7) within the pre-cleaner 184 and the particulate conduit 186. In this regard, as shown in FIG. 7, as the air 112 from the chamber 106 of the cooler box 102 flows through the pre-cleaner 184, the vacuum 188 generated by the vacuum pump 168 pulls the particles 182 into particulate conduit 186. The particles 182 then flow through the particulate conduit 186 and are expelled via the discharge pipe 178. However, it should be appreciated that, in alternative embodiments, the primary air filter pre-cleaner 184 may have any suitable pre-cleaner configuration. For example, the pre-cleaner 184 may be fluidly coupled to a different vacuum source than the vacuum pump 168. Additionally, in some embodiments, the air intake system 100 may not include the pre-cleaner 184.

Furthermore, in several embodiments, the primary air filter assembly 116 of the air intake system 100 may include a primary air filter element 190 downstream of the pre-cleaner 184. In general, the filter element 190 may be configured to remove any particles 182 remaining in the air 112 existing the pre-cleaner 184. In this regard, in one embodiment, the filter element 190 may, for example, be at least partially formed from a fibrous, porous, or mesh material that permits the air 112 to flow through the filter element 190, while trapping or capturing the particles 182 present in the air 112. However, it should be appreciated that, in alternative embodiments, the primary air filter element 190 may have any suitable filter element configuration. Furthermore, although the filter element 190 is illustrated as defining a cuboid shape, the filter element 190 may define any suitable shape in alternative embodiments.

Referring back to FIG. 2, as indicated above, the air intake system 100 may include a secondary air filter 120 positioned downstream from the cooler box 102 and the primary air filter assembly 116. In general, the secondary air filter 120 may be configured to remove particles present in the air 112 flowing through the secondary air filter 120. As such, the secondary air filter 120 may be at least partially formed from a fibrous, porous, or mesh material that permits the air 112 to flow through the secondary air filter 120, while trapping or capturing particles present in the air 112. Furthermore, in several embodiments, the secondary air filter 112 may be spaced apart from the primary air filter assembly 116, such as in one or more of the longitudinal, lateral, and/or vertical directions 122, 128, 134 (FIG. 3). For example, as shown, in one embodiment, the secondary air filter 112 may be positioned within or in fluid communication with the air conduit 118 fluidly coupling the cooler box 102 and the engine 30. In this regard, the air 112 exiting the primary air filter assembly 116 may flow through the air conduit 118 and the second air filter 120 before being supplied to the engine 30 for combustion. Although the secondary air filter 120 is illustrated as having a circular cross-section, the secondary air filter 120 may have any suitable cross-section.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An air intake system for supplying air to an engine of a work vehicle, the air intake system comprising:
    a cooler box including a first wall and a second wall, the first and second walls at least partially defining a chamber within the cooler box;
    a screen defining at least a portion of the first wall of the cooler box, the screen being configured to remove particles present in air entering the chamber of the cooler box;
    one or more heat exchangers within the chamber of the cooler box; and
    an air filter assembly defining at least a portion of the second wall of the cooler box, the air filter assembly including an air filter element configured to remove particles present in the air exiting the chamber of the cooler box through the air filter assembly,
    wherein the air filter assembly is downstream of the one or more heat exchangers such that heat is transferred between the air flowing within the cooler box and the one or more heat exchangers before such air exits the cooler box through the air filter assembly, and
    wherein the air exiting the cooler box through the air filter assembly is supplied to the engine for combustion.

2. The air intake system of claim 1, wherein the air filter assembly further comprises a pre-cleaner positioned upstream of the air filter element, the air intake system further comprising:
    a vacuum source configured to generate a vacuum within the pre-cleaner to remove particles in the air flowing through the pre-cleaner.

3. The air intake system of claim 1, further comprising:
    a pre-cleaner positioned upstream of the screen; and
    a vacuum source configured to generate a vacuum within the pre-cleaner to remove particles that have accumulated on the screen.

4. The air intake system of claim 3, wherein the pre-cleaner comprises a wand configured to rotate relative to the screen to remove the particles that have accumulated on the screen.

5. The air intake system of claim 1, wherein the filter assembly comprises a first pre-cleaner positioned upstream of the air filter element, the air intake system further comprising:
    a second pre-cleaner positioned upstream of the screen; and
    a vacuum source configured to generate a vacuum within the first and second pre-cleaners.

6. The air intake system of claim 1, wherein the second wall is oriented perpendicular relative the first wall.

7. The air intake system of claim 1, wherein the cooler box extends vertically between a top wall and a bottom wall, the second wall corresponding to the top wall of the cooler box.

8. A work vehicle, comprising:

an engine;

a cooler box including a first wall and a second wall, the first and second walls defining a chamber of the cooler box;

a screen defining at least a portion of the first wall of the cooler box, the screen being configured to remove particles present in air entering the chamber of the cooler box;

one or more heat exchangers within the chamber of the cooler box, the one or more heat exchangers being configured to cool one or more fluids circulated through the engine;

an air filter assembly defining at least a portion of the second wall of the cooler box, the air filter assembly including an air filter element configured to remove particles present in the air exiting the chamber of the cooler box through the air filter assembly; and air conduit extending between the air filter assembly and the engine, the air conduit being configured to supply air from the air filter assembly to the engine for combustion, wherein the air filter assembly is downstream of the one or more heat exchangers such that heat is transferred between the air flowing within the cooler box and the one or more heat exchangers before such air exits the cooler box through the air filter assembly.

9. The work vehicle of claim 8, wherein the air filter assembly further comprises a pre-cleaner positioned upstream of the air filter element, the work vehicle further comprising:

a vacuum source configured to generate a vacuum within the pre-cleaner to remove particles in the air flowing through the pre-cleaner.

10. The work vehicle of claim 8, further comprising:

a pre-cleaner positioned upstream of the screen; and a vacuum source configured to generate a vacuum within the pre-cleaner to remove particles that has accumulated on the screen.

11. The work vehicle of claim 10, wherein the pre-cleaner comprises a wand configured to rotate relative to the screen to remove the particles that has accumulated on the screen.

12. The work vehicle of claim 8, wherein the air filter assembly comprises a first pre-cleaner positioned upstream of the air filter element, the work vehicle further comprising:

a second pre-cleaner positioned upstream of the screen; and a vacuum source configured to generate a vacuum within the first and second pre-cleaners.

13. The work vehicle of claim 8, further comprising:

a secondary air filter positioned within the air conduit downstream of the air filter assembly and spaced apart from the cooler box, the secondary air filter being configured to remove particles present in the air flowing through the secondary air filter.

14. The work vehicle of claim 8, wherein the second wall is oriented perpendicular relative the first wall.

15. The work vehicle of claim 8, wherein the cooler box extends vertically between a top wall and a bottom wall, the second wall corresponding to the top wall of the cooler box.

16. The air intake system of claim 1, wherein the first wall and the second wall are directly coupled together.

17. The work vehicle of claim 8, wherein the first wall and the second wall are directly coupled together.

18. An air intake system for supplying air to an engine of a work vehicle, air intake system comprising:

a cooler box including a first wall and a second wall, the first and second walls at least partially defining a chamber within the cooler box;

a screen defining at least a portion of the first wall of the cooler box, the screen being configured to remove particles present in air entering the chamber of the cooler box;

an air filter assembly defining at least a portion of the second wall of the cooler box, the air filter assembly including an air filter element configured to remove particles present in the air exiting the chamber of the cooler box through the air filter assembly; and a secondary air filter positioned downstream of the air filter assembly and spaced apart from the cooler box, the secondary air filter being configured to remove particles present in the air flowing through the secondary air filter, wherein the air exiting the cooler box through the air filter assembly is supplied to the engine for combustion.

* * * * *